United States Patent
Davidson

(10) Patent No.: US 9,263,718 B2
(45) Date of Patent: Feb. 16, 2016

(54) BATTERY KIT FOR USE WITH HEADSET

(71) Applicant: Acuity Ophthalmics, LLC, Fenton, MO (US)

(72) Inventor: Brent Ryan Davidson, St. Louis, MO (US)

(73) Assignee: Acuity Ophthalmics, LLC, Fenton, MO (US)

( * ) Notice: Subject to any disclaimer, the term of this patent is extended or adjusted under 35 U.S.C. 154(b) by 154 days.

(21) Appl. No.: 13/767,559

(22) Filed: Feb. 14, 2013

(65) Prior Publication Data

US 2014/0226264 A1    Aug. 14, 2014

(51) Int. Cl.
| | |
|---|---|
| *F21V 21/084* | (2006.01) |
| *H01M 2/10* | (2006.01) |
| *F21V 21/088* | (2006.01) |
| *F21V 21/08* | (2006.01) |
| *H04R 1/10* | (2006.01) |

(52) U.S. Cl.
CPC ............ *H01M 2/1066* (2013.01); *F21L 15/14* (2013.01); *F21V 21/084* (2013.01); *F21V 21/088* (2013.01); *H04R 1/1025* (2013.01)

(58) Field of Classification Search
CPC ...... F21V 21/084; F21V 21/088; F21L 15/14; A61B 1/06; A61B 1/0692; A42B 1/22; A42B 1/244; H01M 2/1066; H04R 1/1025
USPC .................................................. 362/105, 106
See application file for complete search history.

(56) References Cited

U.S. PATENT DOCUMENTS

| | | | | |
|---|---|---|---|---|
| 3,665,451 | A | * 5/1972 | Keith | ............................ 340/321 |
| 4,199,802 | A | * 4/1980 | Malm | ..................... F21L 11/00 362/105 |
| 4,593,683 | A | 6/1986 | Blaha | |
| 4,631,645 | A | * 12/1986 | Lenart | ........................... 362/105 |
| 4,893,356 | A | * 1/1990 | Waters | ........................... 2/171.3 |
| 5,615,805 | A | 4/1997 | Yoncak | |
| 5,800,042 | A | * 9/1998 | Blank | ........................... 362/105 |
| 7,210,810 | B1 | * 5/2007 | Iversen et al. | ................. 362/105 |
| 7,755,975 | B2 | 7/2010 | Pettersen et al. | |
| D621,535 | S | 8/2010 | Heine et al. | |
| 7,871,174 | B2 | 1/2011 | Heine et al. | |
| 7,926,967 | B2 | * 4/2011 | Spartano et al. | ............. 362/105 |
| 9,039,224 | B2 | * 5/2015 | Delaney et al. | ............... 362/105 |
| 2005/0128735 | A1 | 6/2005 | Atkins et al. | |
| 2005/0276036 | A1 | * 12/2005 | Miles et al. | ................... 362/105 |

(Continued)

FOREIGN PATENT DOCUMENTS

WO    2011042723 A1    4/2011

OTHER PUBLICATIONS

Keeler Vantage Plus Wireless Binocular Indirect Ophthalmoscope; Cal Coast Ophthalmic Product Guide; www.calcoastophthalmic.com; retrieved from Internet Jan. 17, 2013; 2 pages.

*Primary Examiner* — Peggy Neils
(74) *Attorney, Agent, or Firm* — Armstrong Teasdale LLP

(57) ABSTRACT

A battery kit is provided for use with a headset including a headband, and an upper support portion coupled to the headband. An electronic component is coupled to the headset. The electronic component is coupled to a power port configured to receive a power plug. The battery kit includes a power source, a power plug coupled to the power source, and a coupling mechanism configured to removably couple the power source to the upper support portion. The power plug is coupleable to the power port.

20 Claims, 3 Drawing Sheets

(56) References Cited

U.S. PATENT DOCUMENTS

2008/0169998 A1 7/2008 Jacobsen et al.
2010/0277894 A1* 11/2010 Kim .............................. 362/105
2011/0105851 A1 5/2011 Horvath
2012/0113209 A1 5/2012 Ritchey et al.
2012/0120635 A1* 5/2012 Strong et al. .................. 362/105

* cited by examiner

BATTERY KIT FOR USE WITH HEADSET

BACKGROUND

The field of the disclosure relates generally to power packs, and more specifically, to battery kits for use with a headset including, without limitation, an ophthalmic instrument.

Some known headsets are used to provide a hands-free functionality to a user. Some functionality provided by at least some known headsets requires a power source to operate. For example, at least some known headsets include a light source that requires a power source. To provide power to the headset, at least some known headsets must be coupled to an electrical socket via a cord. The cord, however, restricts and limits a mobility of the headset and a user associated with the headset.

To facilitate increasing the mobility of the headset, at least some headsets are portable and include a rechargeable power source. At least some known rechargeable power sources are positioned at a rear portion of the headset, where it is difficult to access the power source during use and/or operation. Moreover, at least some known rechargeable power sources are not removable from the headset.

BRIEF SUMMARY

In one aspect, a battery kit is provided for use with a headset including a headband, and an upper support portion coupled to the headband. An electronic component is coupled to the headset. The electronic component is coupled to a power port configured to receive a power plug. The battery kit includes a power source, a power plug coupled to the power source, and a coupling mechanism configured to removably couple the power source to the upper support portion. The power plug is coupleable to the power port.

In another aspect, a battery kit is provided for use with a headset including a headband, and an upper support portion coupled to the headband. The battery kit includes a power source, and a coupling mechanism configured to removably couple the power source to the upper support portion.

In yet another aspect, a system is provided. The system includes a headset including a headband that includes a first side portion, a second side portion, and an upper support portion extending between the first side portion and the second side portion, a power source, and a coupling mechanism configured to removably couple the power source to the upper support portion.

The features, functions, and advantages may be achieved independently in various implementations of the present disclosure or may be combined in yet other implementations, further details of which may be seen with reference to the following description and drawings.

Although specific features of various implementations may be shown in some drawings and not in others, this is for convenience only. Any feature of any drawing may be referenced and/or claimed in combination with any feature of any other drawing.

DETAILED DESCRIPTION

The present disclosure relates to power packs and, more particularly, to battery kits that may be used with a headset including, without limitation, an ophthalmic instrument. Although the implementations described herein are described in an ophthalmic and/or medical context, the implementations described herein may also be used for any application in any environment that enables the systems and methods to function and/or operate as described herein. In one implementation, a battery kit includes a power source, and a coupling mechanism configured to removably couple the power source to an upper support portion of a headset. In such an implementation, the battery kit enables a wired version of an ophthalmic headset to be converted into a wireless version of the ophthalmic headset.

As used herein, an element or step recited in the singular and preceded with the word "a" or "an" should be understood as not excluding plural elements or steps unless such exclusion is explicitly recited. Moreover, references to "one implementation" or "some implementations" are not intended to be interpreted as excluding the existence of additional implementations that also incorporate the recited features.

Figure 1:
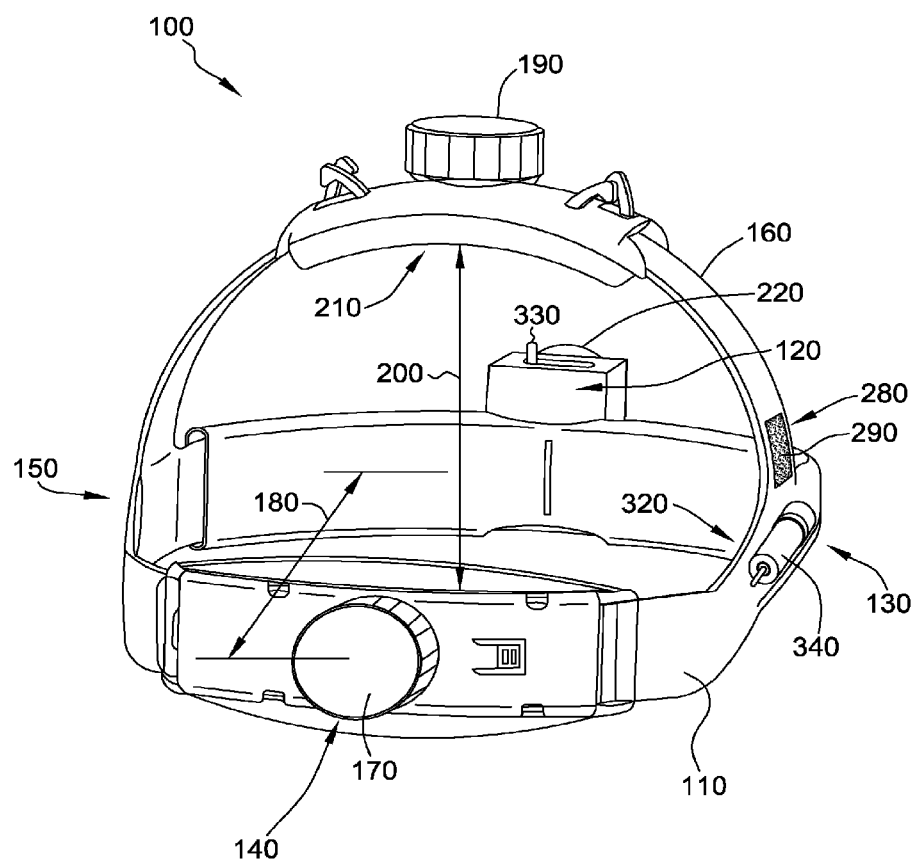
FIG. 1 is a perspective view of an exemplary headset.

FIG. 1 is a perspective view of an exemplary headset 100 including a headband 110 that includes a front portion 120, a first side portion 130, a rear portion 140, and a second side portion 150. First side portion 130 extends between front portion 120 and rear portion 140 on a first side (i.e., a right side) of headband 110, and second side portion 150 extends between front portion 120 and rear portion 140 on a second side (i.e., a left side) of headband 110. Alternatively, headband 100 may have any other configuration and/or orientation that enables headset 100 to function as described herein.

In some implementations, headset 100 includes an upper support portion 160 extending between first side portion 130 and second side portion 150. In at least some implementations, upper support portion 160 is a band that extends between first side portion 130 and second side portion 150. Alternatively, upper support portion 160 may have any other configuration and/or orientation that enables headset 100 to function as described herein.

In some implementations, headset 100 includes at least one adjustment mechanism that enables a size and/or a shape of headset 100 to be selectively changed. For example, in at least some implementations, a first adjustment mechanism 170 is configured to selectively change a diameter 180 of headband 110, and a second adjustment mechanism 190 is configured to selectively change a radius 200 of upper support portion 160. In some implementations, first adjustment mechanism 170 is located at rear portion 140, and/or second adjustment mechanism 190 is located at a center segment 210 of upper support portion 160. That is, in at least some implementations, first adjustment mechanism 170 and/or second adjustment mechanism 190 are substantially centered between side portions 130 and 150. Alternatively, first adjustment mechanism 170 and/or second adjustment mechanism 190 may be in any location that enables headset 100 to function as described herein.

In at least some implementations, first adjustment mechanism 170 and/or second adjustment mechanism 190 is a knob that is selectively rotatable in a first direction (e.g., a clockwise direction) to facilitate decreasing diameter 180 and/or radius 200, respectively, and selectively rotatable in a second direction (e.g., a counterclockwise direction) to facilitate increasing diameter 180 and/or radius 200, respectively. Alternatively, first adjustment mechanism 170 and/or second adjustment mechanism 190 may be any device and/or mechanism that enables diameter 180 and/or radius 200, respectively, to be selectively changed.

In some implementations, headset 100 includes an electronic component 220 coupled to front portion 120 of headband 110. In some implementations, electronic component 220 is a semiconductor light source such as, without limitation, a light emitting diode (LED). Alternatively, electronic component 220 may be any device that requires a power source to function as described herein.

Figure 2:
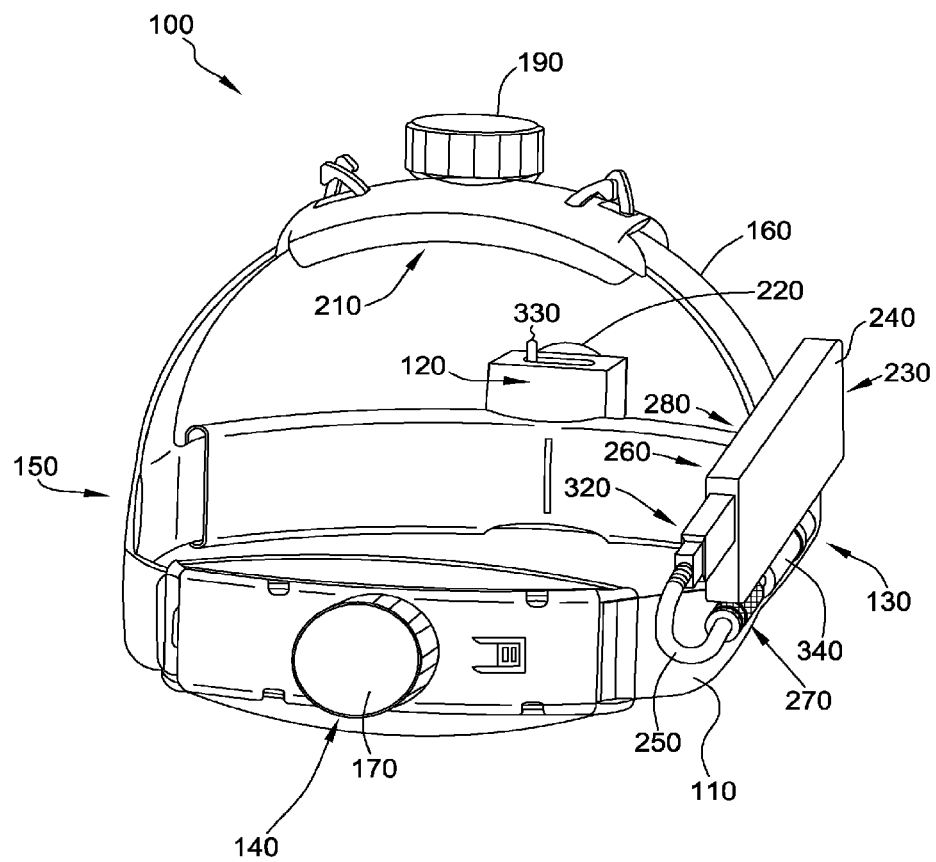
FIG. 2 is a perspective view of the headset shown in FIG. 1 with an exemplary battery kit coupled to the headset.
Figure 3:
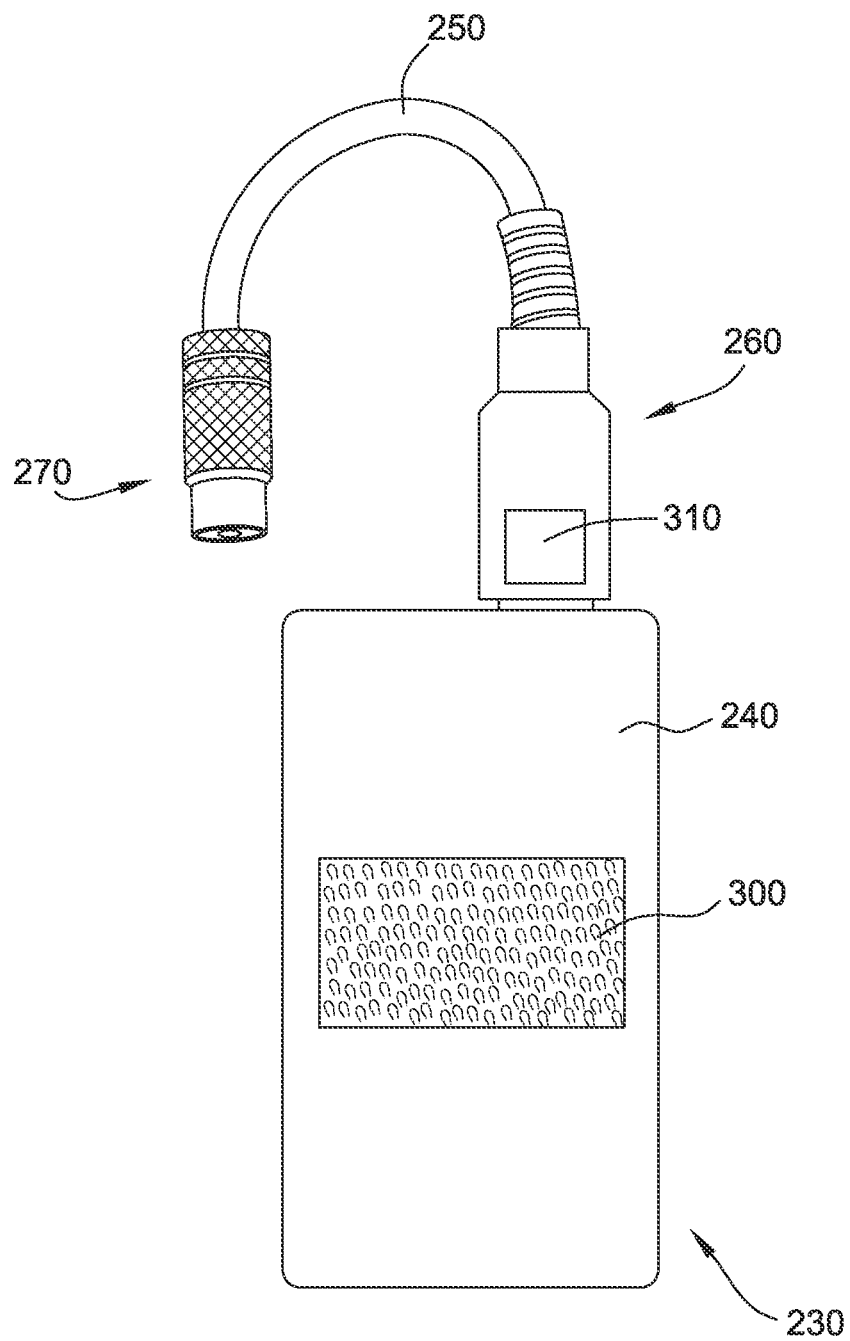
FIG. 3 is a perspective view of the battery kit shown in FIG. 1.

FIG. 2 is a perspective view of a battery kit 230 that may be used with headset 100. FIG. 3 is a perspective view of battery kit 230. In some implementations, battery kit 230 includes a power source 240 configured to selectively provide power to electronic component 220, and a cable 250 that is configured to removably couple power source 240 to electronic component 220. Alternatively, power source 240 may be coupled directly to electronic component 220 and/or be integrated within electronic component 220.

In some implementations, power source 240 is a rechargeable battery that has a weight that is less than a weight of headset 100. In some implementations, power source 240 is less than approximately 450 grams. More particularly, in at least some implementations, power source 240 is less than approximately 400 grams. Even more particularly, in one implementation, power source 240 is less than approximately 380 grams. For example, in one implementation, power source 240 is a lithium ion battery. Alternatively, power source 240 may be any device and/or mechanism and/or may have any weight that enables battery kit 230 to function as described herein.

In some implementations, cable 250 includes a first end 260 that is removably coupleable to power source 240 and/or a second end 270 that is removably coupleable to electronic component 220. For example, in one implementation, first end 260 is a universal serial bus (USB) plug that is removably coupleable to a USB receptacle in power source 240, and second end 270 is a power plug (e.g., direct current connector, alternating current connector) that is removably coupleable to a power port 340 in electronic component 220. In another implementation, first end 260 and/or second end 270 may be integrated with power source 240 and/or electronic component 220, respectively. First end 260 and/or second end 260 may include any device and/or mechanism that enables battery kit 230 to be coupled to electronic component 220.

In some implementations, power source 240 is removably coupleable to a portion of headset 100 that is remote from first adjustment mechanism 170. For example, in one implementation, power source 240 is removably coupleable to upper support portion 160 and, more particularly, to a base segment 280 of upper support portion 160 between center segment 210 and headband 110. In another implementation, power source 240 is removably coupleable to first side portion 130 and/or second side portion 150. Power source 240 may be removably coupled to any portion of headset 100 that enables power source 240 to function as described herein. That is, in at least some implementations, power source 240 is positioned such that power source 240 does not substantially interfere with an adjustment of first adjustment mechanism 170, second adjustment mechanism 190, diameter 180, and/or radius 200.

In some implementations, headset 100 includes a first coupling mechanism 290 (shown in FIG. 1), and power source 240 includes a second coupling mechanism 300 (shown in FIG. 3) that is removably coupleable to first coupling mechanism 290. In such implementations, first and second coupling mechanisms 290 and 300 are complementary to each other and may include, for example, a hook, a loop, a pile, a button, a snap, a magnet, temporary glue, a tongue, a groove, and/or any other coupling mechanism that enables first coupling mechanism 290 to be removably coupled to second coupling mechanism 300. Alternatively, second coupling mechanism 300 may be removably coupleable directly to at least one portion of headset 100. In such implementations, second coupling mechanism 300 may include a clip, a friction-fit, a snap-fit configuration, and/or any other coupling mechanism that enables second coupling mechanism 300 to be removably coupled to headset 100.

In some implementations, battery kit 230 includes an actuation switch 310 (shown in FIG. 3) that is configured to selectively activate electronic component 220. For example, in at least some implementations, actuation switch 310 includes a gate and/or switch that enables a circuit between power source 240 and electronic component 220 to move between an open configuration and a closed configuration. In the open configuration, electronic component 220 does not receive power from power source 240 and, thus, electronic component 220 is not activated. In the closed configuration, electronic component 220 receives power from power source 240 and, thus, electronic component 220 is activated.

In some implementations, actuation switch 310 is positioned adjacent and/or coupled to or against an inner surface 320 of headband 110. Accordingly, in at least some implementations, when a user positions headband 110 about the user's head, actuation switch 310 is moved towards the closed configuration to activate electronic component 220, and, when the user takes headband 110 off of the user's head, actuation switch 310 is moved towards the open configuration to deactivate electronic component 220. For example, as shown in FIG. 3, cable 250 includes actuations switch 310. In at least some implementations, actuation switch 310 is positioned at a side (e.g., a top side) of power source 240, such that actuation switch 310 is accessible and/or manipulatable by a user's hand when headband 110 is positioned about the user's head. Alternatively, actuation switch 310 may be located in any position that enables battery kit 230 to function as described herein.

In some implementations, battery kit 230 includes an adjustment mechanism 330 that is configured to selectively adjust an output of electronic component 220. For example, in at least some implementations, adjustment mechanism 330 includes a gate and/or switch that enables an amount of power, voltage, and/or current received by electronic component 220 to be adjusted to facilitate adjusting the output of electronic component 220. In other implementations, adjustment mechanism 330 includes at least one filter that enables the output of electronic component 220 to be adjusted.

In some implementations, adjustment mechanism 330 has at least one setting that is associated with a predetermined output (e.g., a luminosity) of electronic component 220. In one implementation, adjustment mechanism 330 includes a knob that is selectively slideable and/or rotatable in a first direction (e.g., a clockwise direction) to increase the output of electronic component 220 (e.g., increase a luminosity) and selectively slideable and/or rotatable in a second direction (e.g., a counterclockwise direction) to decrease the output of electronic component 220 (e.g., decrease the luminosity). Alternatively, adjustment mechanism 330 may include any device and/or mechanism that enables battery kit 230 to function as described herein.

During use, in some implementations, power source 240 is chargeable and/or rechargeable at a charging station (not shown). Once at least partially charged, power source 240 may be coupled to headset 100, electronic component 220, and/or cable 250 to provide power to electronic component 220. More particularly, in some implementations, power source 240 is removably coupled to a portion of headset 100 that is not on rear portion 140 centered between side portions 130 and 150 (e.g., to base segment 280 of upper support portion 160).

Once coupled to electronic component 220, power source 240 is configured to activate electronic component 220. In some implementations, actuation switch 310 moves towards the closed configuration such that electronic component 220 receives power from power source 240. In at least some implementations, the output of electronic component 220 is adjustable using adjustment mechanism 330.

The implementations described herein relate to power packs. The implementations described herein enable an ophthalmic instrument to be converted from a "wired" configuration (i.e., plugged into an electrical socket) to a "wireless" configuration (i.e., including a portable battery kit) in a convenient and cost-effective manner. Moreover, the implementations described herein enable a battery kit to be removably coupled to a portion of the ophthalmic instrument such that the battery kit is not centered at the back of the ophthalmic instrument. Accordingly, the implementations described herein enable the battery kit to be comfortably and/or conveniently accessed by the user. That is, the portion of the ophthalmic instrument enables a dominant hand of the user (i.e., right hand for a right-handed person or left hand for a left-handed person) to access and/or manipulate the battery kit.

Some implementations of methods and systems for power packs are described above in detail. The methods and systems are not limited to the specific implementations described herein, but rather, components of systems and/or steps of the method may be utilized independently and separately from other components and/or steps described herein. Each method step and each component may also be used in combination with other method steps and/or components. Although specific features of various implementations may be shown in some drawings and not in others, this is for convenience only. Any feature of a drawing may be referenced and/or claimed in combination with any feature of any other drawing.

This written description uses examples to disclose the various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A battery kit for use with a headset having a front and a back, the headset including a headband, an upper support portion coupled to the headband, and an electronic component coupled to the headband at the front of the headset, the electronic component having a power port, said battery kit comprising:
   a power source;
   a power plug coupleable to the power source and to the power port; and
   a coupling mechanism configured to removably couple the power source to the upper support portion such that the battery kit is not centered at the back of the headset.

2. A system comprising:
   a headset having a front and a back, the headset comprising a headband, an upper support portion coupled to the headband, and a light source coupled to the headband at the front of the headset; and
   a battery kit comprising:
     a power source for the light source; and
     a coupling mechanism configured to removably couple the power source to the upper support portion such that the battery kit is not centered at the back of the headset.

3. A system in accordance with claim 2, wherein the battery kit comprises a cable removably coupleable to the power source.

4. A system in accordance with claim 2 further comprising an adjustment mechanism configured to adjust an amount of power received by the light source from the power source.

5. A system in accordance with claim 4, wherein the adjustment mechanism has at least one setting associated with a predetermined output of the light source.

6. A system in accordance with claim 2, wherein the headband comprises an inner surface and wherein the battery kit comprises an actuation switch coupled to the inner surface of the headband to facilitate activating the light source when the headband is positioned about a user's head and deactivating the light source when the headband is removed from the user's head.

7. A system in accordance with claim 2, wherein the power source has a weight that is less than a weight of the headset.

8. A system in accordance with claim 2, wherein the power source comprises a lithium-ion battery.

9. A system comprising:
   a headset having a front and a back, the headset comprising:
     a headband that comprises a first side portion and a second side portion;
     an upper support portion extending between the first side portion and the second side portion; and
     a light source coupled to the headband at the front of the headset;
   a battery kit comprising a power source for the light source; and
   a coupling mechanism configured to removably couple the power source to the upper support portion such that the battery kit is not centered at the back of the headset.

10. A system in accordance with claim 9, wherein the headset has only one upper support portion.

11. A system in accordance with claim 9, wherein the light source is a light emitting diode.

12. A system in accordance with claim 9 further comprising a cable removably coupleable to the power source and to the light source.

13. A system in accordance with claim 9 further comprising an adjustment mechanism configured to adjust an amount of power received by the light source from the power source.

14. A system in accordance with claim 13, wherein the adjustment mechanism has at least one setting associated with a predetermined output of the light source.

15. A system in accordance with claim 9, wherein the headband comprises an inner surface and wherein the battery kit comprises an actuation switch coupled to the inner surface of the headband to facilitate activating the light source when the headband is positioned about a user's head and deactivating the light source when the headband is removed from the user's head.

16. A system in accordance with claim 9, wherein the power source has a weight that is less than a weight of the headset.

17. A system in accordance with claim 9 further comprising an adjustment mechanism configured to change a diameter of the headband.

18. A system in accordance with claim 17, wherein the power source is positioned remote from the adjustment mechanism.

19. A system in accordance with claim 9 further comprising an adjustment mechanism configured to change a radius of the upper support portion.

20. A system in accordance with claim 19, wherein the power source is positioned remote from the adjustment mechanism.

* * * * *